United States Patent
Watanabe et al.

(10) Patent No.: US 6,824,589 B2
(45) Date of Patent: Nov. 30, 2004

(54) MATERIALS AND METHODS FOR THE PURIFICATION OF INERT, NONREACTIVE, AND REACTIVE GASES

(75) Inventors: Tadaharu Watanabe, Superior, CO (US); Dan Fraenkel, Ponca City, OK (US); Robert Torres, Jr., Parker, CO (US)

(73) Assignee: Matheson Tri-Gas, Longmont, CO (US)

( * ) Notice: Subject to any disclaimer, the term of this patent is extended or adjusted under 35 U.S.C. 154(b) by 0 days.

(21) Appl. No.: 10/284,423

(22) Filed: Oct. 29, 2002

(65) Prior Publication Data

US 2003/0094098 A1 May 22, 2003

Related U.S. Application Data

(60) Provisional application No. 60/336,327, filed on Oct. 31, 2001.

(51) Int. Cl.[7] .............................................. B01D 53/02
(52) U.S. Cl. .............................. 95/117; 95/137; 95/138; 95/139; 95/140
(58) Field of Search ............................ 95/90, 129, 135, 95/137–140; 96/154; 423/219, 220, 230, 231, 239.1, 239.2, 242.1, 244.02, 244.03, 244.04, 244.07, 247; 502/406, 407

(56) References Cited

U.S. PATENT DOCUMENTS

| | | | |
|---|---|---|---|
| 4,713,224 A | | 12/1987 | Tamhankar et al. .......... 423/219 |
| 4,976,944 A | | 12/1990 | Pacaud et al. ............... 423/347 |
| 5,196,380 A | * | 3/1993 | Shadman ........................ 502/4 |
| 5,637,544 A | * | 6/1997 | Shadman ........................ 502/4 |
| 5,716,588 A | | 2/1998 | Vergani et al. .............. 422/177 |
| 6,059,859 A | | 5/2000 | Alvarez, Jr. et al. .......... 95/117 |
| 6,066,591 A | * | 5/2000 | Murphy et al. .............. 502/417 |
| 6,099,619 A | * | 8/2000 | Lansbarkis et al. ........... 95/118 |
| 6,241,955 B1 | * | 6/2001 | Alvarez, Jr. ................. 423/210 |
| 6,391,090 B1 | * | 5/2002 | Alvarez et al. ................ 95/116 |
| 6,461,411 B1 | * | 10/2002 | Watanabe et al. .............. 95/116 |

* cited by examiner

Primary Examiner—Frank M. Lawrence
(74) Attorney, Agent, or Firm—Steven C. Petersen; Sarah J. Smith; Hogan & Hartson L.L.P.

(57) ABSTRACT

Regenerable gas purifier materials are provided capable of reducing the level of contaminants such as oxygen and water in an inert, nonreactive or reactive gas stream to parts-per-billion levels or sub-parts-per-billion levels. The purifier materials of this invention comprise a thin layer of one or more reduced forms of a metal oxide coated on the surface of a nonreactive substrate. The thin layer may further contain the completely reduced form of the metal.

21 Claims, No Drawings

MATERIALS AND METHODS FOR THE PURIFICATION OF INERT, NONREACTIVE, AND REACTIVE GASES

CROSS-REFERENCE TO RELATED APPLICATIONS

This application claims priority to U.S. Provisional Application No. 60/336,327, filed Oct. 31, 2001, and entitled "Materials and Methods for the Purification of Inert, Nonreactive and Reactive Gases," which is specifically incorporated herein by reference.

BACKGROUND OF THE INVENTION

1. Field of the Invention

This invention relates to the field of gas purification, and to the purification of inert, nonreactive and reactive gases. More specifically, the invention relates to methods and materials for selectively removing trace amounts of impurities such as oxygen, water, CO, $CO_2$, NO, $NO_2$ $N_2O_4$, $SO_2$, $SO_3$, SO, $S_2O_2$, and $SO_4$ from inert, nonreactive, and reactive gases.

2. Description of the Prior Art

The provision of high purity gas streams is critically important in a wide variety of industrial and research applications. The rapid expansion of vapor-phase processing techniques, e.g. chemical vapor deposition, in the semiconductor industry has been associated with the deployment and use of manufacturing equipment that is totally reliant on the delivery of ultra-high purity process gases at the point of use in the semiconductor manufacturing facility.

Considering the impurities which are present in gas streams involved in semiconductor manufacturing, it is to be noted that the growth of high quality thin film electronic and optoelectronic cells by chemical vapor deposition or other vapor-based techniques is inhibited by a variety of low-level process impurities. These impurities can cause defects that reduce yields by increasing the number of rejects, which can be very expensive. These impurities may be particulate or chemical contaminants.

Chemical impurities may originate in the production of the source gas itself, as well as in its subsequent packaging, shipment, storage, and handling. Although source gas manufacturers typically provide analyses of source gas materials delivered to the semiconductor manufacturing facility, the purity of the gases may change because of leakage into or outgassing of the containers, e.g. gas cylinders, in which the gases are packaged. Impurity contamination may also result from improper gas cylinder changes, leaks into downstream processing equipment, or outgassing of such downstream equipment.

Inert and non-reactive gases such as nitrogen, helium, and argon are widely used in the semiconductor industry for the manufacture of microcircuitry devices. In such applications, it is critical that the gases be essentially completely free of impurities such as water and oxygen. For example, in semiconductor fabrication processes, gases such as nitrogen, helium and argon are often required to not have more than low ppb or sub-ppb impurity levels to ensure that the impurities do not degrade the quality, and hence the performance of the semiconductor chips. Such impurities, when introduced onto the semiconductor chip during its manufacture, tend to render the chip deficient or even useless for its intended use. Thus, a growing number of industries are now requiring gases having impurity concentrations that do not exceed about 10 parts-per-billion (ppb) levels.

One known method of gas purification involves the adsorption of process gas impurities on a bed or column of solid scavenger material. In these solid adsorption methods, impurities are caught by the surface of the scavenger material while the process gas preferably passes unaltered through the bed or column. Commonly used solid scavenger adsorption materials include alumina, silica, silica-alumina, other metal oxides such as titania and zirconia, mixed oxides, clays, molecular sieves (e.g., zeolites), and activated carbon.

There remains a need in the art for a reagent that removes contaminants such as oxygen, water, CO, $CO_2$, NO, $NO_2$, $N_2O_4$, $SO_2$, $SO_3$, SO, $S_2O_2$, and $SO_4$ from inert nonreactive and reactive gases. Further, there remains a need for a reagent that is more efficient (removes more contaminants per square meter of surface area) than the prior art. Moreover, there is a need for a purifier material that can be regenerated. Further, a need exists for purifier materials that remove impurities from inert, nonreactive, and reactive gases without concurrently emitting contaminants such as water into the purified gas stream.

SUMMARY OF THE INVENTION

Accordingly, this invention provides a purifier material capable of reducing the level of contaminants such as oxygen, water, CO, $CO_2$, NO, $NO_2$, $N_2O_4$, $SO_2$, $SO_3$, SO, $S_2O_2$, and $SO_4$ in an inert, nonreactive, or reactive gas stream to parts-per-billion levels or sub-parts-per-billion levels. The purifier materials of this invention comprise a thin layer of reduced forms of an oxide of a metal deposited or coated onto the surface of a nonreactive substrate. The reduced forms of the metal oxide thin layer coating include one or more reduced oxides of the metal in which the oxidation state of the metal is lower than the maximum oxidation state of the metal. In addition to the reduced oxides of the metal, the thin layer may further include the completely reduced form of the metal (i.e., the metal in a zero oxidation state).

This invention further provides methods of removing one or more contaminants from inert, nonreactive, or reactive gas streams using purifier materials of this invention. In one embodiment, the method of this invention for removing contaminants from an inert, nonreactive, or reactive gas stream comprises contacting said contaminated gas stream with a purifier material for a period of time sufficient to reduce the level of said contaminants to parts-per-billion levels, said purifier material of this invention, said purifier material comprising a nonreactive substrate having deposited thereon a thin layer of one or more reduced forms of a metal oxide, wherein said metal oxide is selected from the group consisting of oxides of molybdenum, antimony, bismuth, tin, chromium, cobalt, copper, tungsten, manganese, iron, and mixtures thereof.

Another embodiment of this invention for removing contaminants from an inert, nonreactive, or reactive gas stream comprises contacting said contaminated gas stream with a purifier material of this invention for a period of time sufficient to reduce the level of said contaminants to parts-per-billion levels, said purifier material comprising a nonreactive substrate having deposited thereon a thin layer of one or more reduced forms of an oxide of a metal, said thin layer having a total surface area less than 100 $m^2/g$.

Yet another embodiment of this invention for removing contaminants from an inert, nonreactive, or reactive gas stream comprises contacting said contaminated gas stream with a purifier material of this invention for a period of time sufficient to reduce the level of said contaminants to parts-per-billion levels, said purifier material comprising a nonreactive, substrate having deposited thereon a thin layer of one or more reduced forms of an oxide of a metal, wherein the oxidation state of said metal in said purifier thin layer is lower than the maximum oxidation state of said metal, wherein said metal is other than nickel.

Additional features of this invention shall be set forth in part in the description that follows, and in part will become apparent to those skilled in the art upon examination of the following specification or may be learned by the practice of the invention

DETAILED DESCRIPTION OF THE INVENTION

This invention provides methods of producing purifier materials for removing impurities including, but not limited to, oxygen, water, CO, $CO_2$, NO, $NO_2$, $N_2O_4$, $SO_2$, $SO_3$, SO, $S_2O_2$, and $SO_4$ from inert, nonreactive, and reactive gases. The purifier materials of this invention are capable of reducing the level of contaminants from inert or nonreactive gases including, but not limited to, nitrogen ($N_2$), hydrogen ($H_2$), helium (He), neon (Ne), argon (Ar), krypton (Kr), xenon (Xe), radon (Rn), saturated and unsaturated hydrocarbons including, but not limited to methane and butene, saturated and unsaturated halocarbons including, but not limited to tetrafluoromethane and octafluorocyclopentene ($C_5F_8$), NF3, $SF_6$ and mixtures thereof. The purifier materials of this invention are also capable of reducing the level of contaminants from reactive gases including, but not limited to, $SO_2$, CO, NO, $NO_2$, $N_2O$, $CO_2$, $H_2S$, primary amines, secondary amines, and tertiary amines. The purifier materials produced by the methods of this invention are capable of reducing the level of contaminants in inert, nonreactive, and reactive gas streams to parts-per-billion levels or sub-parts-per-billion levels.

Each purifier material is designed to remove specific impurities from specific matrix gases. By way of illustration, a purifier material can be designed to remove $SO_2$ from NO by selecting the proper metal and proper oxidation state of the metal in the thin layer of the purifier material to selectively remove $SO_2$, while remaining non-reactive to NO. That is, a purifier material of this invention cannot be used to remove an impurity where the "impurity" is the same gas as the matrix gas (e.g., the purifier will not remove $SO_2$ from a $SO_2$ matrix gas).

In one embodiment, a purifier material of this invention is produced by the method comprising:

(a) providing a precursor comprising a nonreactive substrate having deposited thereon a thin layer of a metal of a first oxidation state;

(b) heating the precursor under a flow of nitrogen at a temperature between about 100° C. and 600° C. for a period of time; and (c) treating the precursor from step (b) under reductive conditions sufficient to reduce the oxidation state of the metal in the precursor thin layer, thereby producing a purifier material comprising a nonreactive substrate having deposited thereon a thin layer of one or more reduced forms of an oxide of the metal of a second oxidation state, wherein the second oxidation state is lower than the first oxidation state.

In another embodiment, a purifier material of this invention may be produced from a precursor comprising a substrate having deposited thereon a thin layer of a first form of the metal, wherein the purifier material is produced by changing the form of the metal in the thin layer without changing the oxidation state of the metal. For example, in one embodiment the precursor comprises a nonreactive substrate coated with a salt form of the metal. The treatment step comprises treating the precursor with nitrogen, followed by treating the precursor under conditions sufficient to change the form of the metal (e.g., by decomposition of the metal salt) without changing the oxidation state. This embodiment thus produces a purifier comprising a substrate coated with a thin layer of a metal oxide, wherein the oxidation state of the metal oxide of the purifier is the same as the oxidation state of the metal salt of the precursor. Further, the oxidation state of the metal in the purifier thin layer is lower than the maximum oxidation state possible for that metal.

As used herein, the term "precursor" refers to a nonreactive substrate coated with a thin layer of a metal having a first oxidation state or a thin layer of a first (non-oxide) form of a metal. The oxidation state of the metal of the precursor thin layer need not be in its maximum oxidation state.

In one embodiment, the thin layer of either the precursor or the purifier material comprises a monolayer thickness of the particular form of the metal coated or deposited onto the surface of the nonreactive substrate. However, the thin layer may also comprise two or more layers of the particular form of the metal coated onto the surface of the nonreactive substrate. The terms "thin layer," "coating," and "thin layer coating" are used interchangeably herein.

As used herein, the term "nonreactive substrate" refers to a material that is stable under both oxidative and reductive conditions, i.e., a material that is neither oxidized nor reduced under reaction conditions such as those used in the methods of this invention. Examples of nonreactive substrates suitable for purposes of this invention include, but are not limited to, alumina, amorphous silica-alumina, silica ($SiO_2$), aluminosilicate molecular sieves, titania ($TiO_2$), zirconia ($ZrO_2$), and carbon. The substrates are commercially available in a variety of shapes of different sizes, including, but not limited to, beads, sheets, extrudates, powders, tablets, etc.

The surface of the precursor substrate can be coated with a thin layer of a particular form of the metal (e.g., a metal oxide or a metal salt) using methods known to those skilled in the art, including, but not limited to, incipient wetness impregnation techniques, ion exchange methods, vapor deposition, spraying of reagent solutions, co-precipitation, physical mixing, etc. In addition, many such coated precursors are commercially available.

The terms "metal having a first oxidation state" and "first form of a metal" are used interchangeably and refer to the form of the metal comprising the thin layer coated onto the surface of the precursor. For example, in one embodiment the precursor coating comprises a thin layer of a metal having a first oxidation state which is consequently treated to produce a purifier material comprising a nonreactive substrate coated with a thin layer of one or more oxides of the metal having a second, lower oxidation state. In another embodiment, the precursor coating comprises a first form of the metal wherein the first form is other than a metal oxide. In this embodiment, the precursor is treated to produce a purifier material comprising a nonreactive substrate coated with a thin layer of a metal oxide having the same oxidation state as the first form of a metal. Examples of a "metal having a first oxidation state" and "first form of a metal" include, but are not limited to, an oxide, a salt, an acid, an organic complex or an inorganic complex of the metal. Examples of metals suitable for purposes of this invention include, but are not limited to, vanadium, molybdenum, antimony, bismuth, tin, cerium, chromium, cobalt, copper, tungsten, manganese, iron, and mixtures thereof. Suitable metal salts for purposes of this invention include, but are not limited to, nitrates, carbonates, oxalates, etc.

In another embodiment, the purifier materials further comprise an alkaline metal, alkaline metal oxide, or alkaline metal hydroxide deposited over the metal oxide thin layer and/or mixed in with the metal oxide thin layer. Alkaline metals include lithium, sodium, potassium, rubidium, and cesium.

In one embodiment for producing the purifier materials of this invention, the coated precursor is first heated under a flow of nitrogen to remove most of the moisture contained in the precursor. It was observed that the removal of water prior to the treatment step (e.g., the reduction step or the decomposition step) allowed the subsequent steps to proceed more efficiently, as discussed below. The precursor is heated under a flow of nitrogen at a temperature between about 100° C. and 600° C. for a period of time sufficient to remove the majority of the moisture from the precursor. In one embodiment, the precursor is heated under nitrogen for a period of time between about 1 and 200 hours. The precursor is contained in a sealed canister or reactor during the nitrogen treatment, and is maintained in this sealed environment after the nitrogen treatment to prevent recontamination of the precursor with moisture prior to the reduction step.

In one embodiment, the nitrogen-treated precursor is then treated under reductive conditions sufficient to reduce the oxidation state of the metal in the thin layer from a first oxidation state to a second oxidation state, wherein the second oxidation state is lower than the first oxidation state. The product obtained after the reduction step is a purifier material having deposited thereon a thin layer of one or more reduced forms of a metal oxide, wherein the oxidation state of each metal oxide form is lower than the oxidation state of the metal in the precursor coating. A portion of the thin layer of the purifier may also comprise zero valent metal, as discussed below. However, the reductive conditions used in the methods of this invention do not completely reduce all of the metal in the precursor coating to the elemental metal.

In another embodiment, the reduction step comprises contacting the nitrogen-treated precursor with 100% hydrogen gas at an elevated temperature for a time sufficient to reduce the precursor thin layer metal of a first oxidation state, thereby forming a coating of one or more oxides of the metal having a second, lower oxidation state. In one embodiment, the precursor is heated under a flow of 100% hydrogen at a temperature between about 300° C. and 600° C. for a period of time between about 1 and 200 hours. The resulting purifier material comprises a nonreactive substrate coated with a thin layer comprising one or more reduced forms of an oxide of the metal. In one embodiment, a percentage of the thin layer of the purifier material further contains the metal in its zero oxidation state.

In another embodiment, the reduction step comprises contacting the nitrogen-treated precursor with a gaseous mixture comprising hydrogen and an inert or nonreactive gas such as argon, helium, or nitrogen, where the mixture comprises from about 0.1% up to 100% hydrogen. Reaction variables such as time, temperature, etc., are selected such that the reductive conditions are sufficient to reduce the precursor thin layer metal of a first oxidation state, thereby forming a coating of one or more oxides of the metal having a second, lower oxidation state.

In another embodiment, the reductive conditions comprise contacting the nitrogen-treated precursor with a gaseous mixture comprising hydrogen and a reactive gas such as ammonia, where the mixture comprises from about 0.1% up to 100% hydrogen. Reaction variables such as time, temperature, etc. are selected such that the reductive conditions are sufficient to reduce the precursor thin layer metal of a first oxidation state, thereby forming a coating of one or more oxides of the metal having a second, lower oxidation state.

In another embodiment, the reduction step comprises contacting the nitrogen-treated precursor with a gaseous mixture with either 100% ammonia, or with a gaseous mixture comprising ammonia and an inert or nonreactive gas such as argon, helium, or nitrogen, where the mixture comprises from about 0.1% up to 100% ammonia. Reaction variables such as time, temperature, etc. are selected such that the reductive conditions are sufficient to reduce the precursor thin layer metal of a first oxidation state, thereby forming a coating of one or more oxides of the metal having a second, lower oxidation state.

In another embodiment, the oxidation state of the metal in the precursor thin layer is reduced by reacting the nitrogen-treated precursor with a reducing agent such as hydrazine, hydrazine derivative, lithium aluminum hydride, etc., either in a liquid solution or in the gas phase, according to methods known in the art. Reaction variables such as time, temperature, etc., are selected such that the reductive conditions are sufficient to reduce the precursor thin layer metal of a first oxidation state, thereby forming a coating of one or more oxides of the metal having a second, lower oxidation state.

In another embodiment, a purifier material may be produced from a precursor comprising a nonreactive substrate coated with a thin layer of a first form of the metal, such as a metal salt, wherein the treatment step comprises decomposing the metal salt to produce a thin layer of a metal oxide without changing the oxidation state of the metal. In this embodiment, the oxidation state of the metal in the precursor coating is lower than the maximum oxidation state possible for that metal. In one non-limiting example, the precursor comprises a thin layer of cerium (III) nitrate coated onto the surface of an alumina substrate. In this embodiment, the precursor is treated with nitrogen, followed by subjecting the precursor to conditions that will decompose the cerium (III) nitrate to cerium (III) oxide.

In general, the final purifier material comprises about 1 to 90% of the reduced forms of the metal oxide and about 10 to 99% of the substrate. For example, in one non-limiting embodiment the final purifier material comprises about 5–30% of the reduced forms of the metal oxide and about 70–95% of the substrate. Further, the total surface area of the thin layer of the final purifier material is generally between about 20 $m^2/g$ and 800 $m^2/g$. For example, in one embodiment, the total surface area of the thin layer of the final purifier material is less than 100 $m^2/g$. In another embodiment, the total surface area of the thin layer of the final purifier material is between about 10 and 140 $m^2/g$. In yet another embodiment, the total surface area of the thin layer of the final purifier material is between about 30 and 300 $m^2/g$ As used herein, the terms "reduced forms of an oxide of the metal" and "metal oxide having a second, lower oxidation state" refer to one or more oxide forms of the metal in which the metal has a lower oxidation state than that of the metal in the precursor thin layer. The thin layer of a final purifier product of this invention may contain one or more different metal oxides. Thus, the term "second oxidation state" is not limited to one specific oxidation state, but rather encompasses different forms of the metal, wherein each of the metal oxides in the purifier coating has an oxidation state that is lower that that of the metal of the precursor coating. The term "reduced forms of an oxide of a metal" also encompasses zero valent metal.

For example, in one non-limiting embodiment the metal oxide thin layer of a precursor is a molybdenum oxide. Molybdenum is known to form at least four oxides, which are, in descending order of oxidation state of molybdenum, $MoO_3$, $Mo_2O_5$, $MoO_2$, and $Mo_2O_3$. Thus, if the precursor comprises a thin layer of $MoO_3$ (in which the oxidation state of Mo is +6), then the reduction step can produce a final purifier material having a thin layer that contains one or more of the lower oxides of molybdenum, including $Mo_2O_5$, $MoO_2$, and $Mo_2O_3$. In addition to the one or more reduced forms of molybdenum oxide, a percentage of the thin layer of the purifier material may also contain metallic molybdenum (Mo), i.e., molybdenum in its zero oxidation state. The composition of the thin layer of the purifier material will of course depend on the amount of time the precursor is exposed to hydrogen gas during the reduction step, as well as the temperature during the reduction. Alternatively, if the precursor comprises a thin layer of $Mo_2O_5$ (in which the oxidation state of Mo is +5), then the thin layer of the final purifier material may comprise one or more of the lower oxides of molybdenum, including $MoO_2$ and $Mo_2O_3$, and may further contain molybdenum in its zero oxidation state (Mo).

It is not necessary that the first oxidation state of the metal in the precursor thin layer be the maximum oxidation state for that metal. However, at least a portion of the metal in the final purifier thin layer is a reduced metal oxide. That is, at least a portion of the metal in the thin layer of the final product is between the first oxidation state of the metal of the precursor layer and the zero oxidation state of the metal.

The present invention also includes methods of purifying contaminated inert, nonreactive or reactive gases using the purifier materials of this invention. More specifically, this invention provides a method of removing contaminants including, but not limited to, oxygen, water, CO, $CO_2$, NO, $NO_2$, $N_2O_4$, $SO_2$, $SO_3$, SO, $S_2O_2$, and $SO_4$ from an inert nonreactive or reactive gas stream comprising contacting the contaminated gas stream with a purifier material for a period of time sufficient to reduce the level of the contaminants to parts-per-billion levels. The purifier material of this invention is generally contained within a gas purifier chamber having a gas inlet and outlet. Many container configurations are well known to those skilled in the art. The purifier materials of this invention can be made in situ (i.e., within the container to be used in a gas purification system). Alternatively, the purifier materials can be made in a separate container and subsequently transferred to a gas purifier container.

For example, in one method of this invention for removing contaminants from an inert, nonreactive, or reactive gas stream, the purifier material comprises a nonreactive substrate having deposited thereon a thin layer of one or more reduced forms of a metal oxide, wherein the metal oxide is selected from the group consisting of oxides of molybdenum, antimony, bismuth, tin, chromium, cobalt, copper, tungsten, manganese, iron, and mixtures thereof.

Another embodiment of this invention for removing contaminants from an inert, nonreactive, or reactive gas stream, the purifier material comprises a nonreactive substrate having deposited thereon a thin layer of one or more reduced forms of an oxide of a metal, wherein thin layer having a total surface area less than 100 m²/g.

In yet another embodiment of this invention for removing contaminants from an inert, nonreactive, Or reactive gas stream, the purifier material comprises a nonreactive substrate having deposited thereon a thin layer of one or more reduced forms of an oxide of a metal other than nickel, wherein the oxidation state of the metal in the purifier thin layer is lower than the maximum oxidation state of the metal In yet another embodiment of this invention for removing contaminants from an inert, nonreactive, or reactive gas stream, the purifier material comprises a nonreactive substrate having deposited thereon a thin layer of one or more reduced forms of an oxide of a metal other than Group 3b metals (scandium, yttrium and lanthanum), Group 4b metals (titanium, zirconium and hafnium), vanadium, and lanthanide metals (cerium, praseodymium, neodymium, samarium, europium, gadolinium, terbium, dysprosium, holmium, erbium, thulium, ytterbium and lutetium).

The purifier materials can be used in any compatible gas purifier system in the art. The method of purifying inert, nonreactive or reactive gases generally comprises flowing the contaminated inert, nonreactive or reactive gas through a container in which a purifier material of this invention is retained. Typically, gas flow rates during a purification process are in the range of about 1 to 5000 standard liters per minute (slpm). Operating temperatures of the inert, nonreactive or reactive gases can range from about −70° C. to 400° C. For example, in one non-limiting embodiment, the operating temperatures are between about −50° C. and 100° C.

As used herein, the term "inert or nonreactive gas" includes, but is not limited to, nitrogen ($N_2$), hydrogen ($H_2$), helium (He), neon (Ne), argon (Ar), krypton (Kr), xenon (Xe), radon (Rn), saturated and unsaturated hydrocarbons including, but not limited to methane and butene, saturated and unsaturated halocarbons including, but not limited to tetrafluoromethane and octafluorocyclopentene ($C_5F_8$), $NF_3$, and $SF_6$, or mixtures thereof.

As used herein, the term "reactive gas" includes, but is not limited to, $SO_2$, CO, NO, $NO_2$, $N_2O$, $CO_2$, $H_2S$, primary amines, secondary amines, and tertiary amines.

As stated above, the purifier materials of this invention comprise a thin layer coating of one or more reduced forms of the metal oxide on the surface of the substrate. As a result, all or substantially all of the active sites of the thin layer are exposed to the contaminated inert or nonreactive gas during the purification step, thus increasing the efficiency of the thin layer to trap and thus remove contaminants from the inert or nonreactive gas stream. This is a significant improvement over bulk metal oxide purifiers in the art which are not coated onto substrates, since many of the active sites in the bulk purifiers are not situated at or near the surface of the bulk material and therefore are not accessible to the contaminants.

The purifier materials of this invention can be regenerated efficiently, thus extending the lifetime of the purifier material. In addition, the purifier materials of this invention are potentially more stable than other purifier materials in the art.

The purifier materials of this invention are suitable for purifying gases for semiconductor and other electronic substrate manufacturing. More generally, the purifier materials of this invention are useful for removing contaminants from any inert, non-reactive or reactive gas that is used for deposition of component materials for any other type of high purity product where contaminants such as oxygen, water, CO, $CO_2$, NO, $NO_2$, $N_2O_4$, $SO_2$, $SO_3$, SO, $S_2O_2$ and/or $SO_4$ are detrimental to the product's production. This could include, for instance, production of high purity substrates or other types of materials for research purposes, production of optical fibers and optoelectronic devices (including lasers) and production of high purity materials that are to be used in extreme environments such as products for use in spacecraft or artificial satellites.

EXAMPLE 1

Deposition of Cerium Nitrate onto Alumina by Incipient Wetness Impregnation

Alumina was modified by $Ce(NO_3)_3 \cdot 6H_2O$ to form a cerium oxide coating (150–200 $m^2/g$) on the alumina using an incipient wetness impregnation technique. About 222 mL (122.77 g) of alumina beads was dried was dried in a vacuum oven at about 110° C. overnight, then cooled to room temperature under vacuum. To this was added a solution of 19.0 g $Ce(NO_3)_3 \cdot 6H_2O$ in 36.8 g $H_2O$ dropwise in a 600 mL beaker. After about 30–40 minutes, all of the solution was added without any observation of outside wetting of the alumina beads. The material obtained was capped by aluminum foil and allowed to equilibrate at room temperature for about 20 hours. The material was then heated to about 110° C. for about 20 hours in a vacuum oven. A sample of the obtained (dry) $Ce(NO_3)_3 \cdot 6H_2O/Al_2O_3$ (containing about 5% Ce) was analyzed by thermogravimetric analysis using a TGA-7 thermogravimetric analyzer from PerkinElmer. Two peaks were obtained, one at about 200° C. and the other at about 400° C. The peak at about 200° C. is water (as in $Al_2O_3$) and the peak at about 400° C. (not found in $Al_2O_3$) was due to nitrate decomposition. Decomposition starts at about 280° C. (at 20° C./min heating rate) and is complete at about 550° C.

EXAMPLE 2

Assaying the Oxygen and Water Adsorbing Capabilities of High Surface Area $Ce_xO_y/Al_2O_3$ Purifier Materials Various purifier materials comprising a thin layer of reduced forms of cerium oxide coated on an alumina substrate were prepared and tested for their efficiency in removing oxygen from ammonia and helium. The results are summarized in Table 1, where the formula "$Ce_xO_y/Al_2O_3$" indicates the various reduced forms of the metal oxide on the alumina substrate (i.e., where x=0–3 and y=0–2). Sample 6 started with fresh $Ce(NO_3)_3 \cdot 6H_2O/Al_2O_3$ (containing about 5% Ce) prepared as described in Example 1. This material was conditioned twice with nitrogen at different temperatures as shown in Table 1. This sample was tested for its ability to remove oxygen from ammonia as described above. The results obtained for sample 6 indicate that treating a precursor material with nitrogen alone (i.e., without subsequently treating the precursor to reducing conditions) is not sufficient to produce a material that is efficient in removing trace levels of oxygen from a hydride gas.

To prepare sample 7-1, fresh $Ce(NO_3)_3 \cdot 6H_2O/Al_2O_3$ (containing about 5% Ce) was prepared as described in Example 1. This material was conditioned twice with nitrogen at different temperatures and then conditioned with 10% hydrogen to produce a $Ce_xO_y/Al_2O_3$ purifier material 7-1 as summarized in Table 1. Sample 7-1 Was tested for its ability to remove oxygen from ammonia as described above. Sample 6 was not efficient in removing oxygen.

The conditioned and tested purifier material 7-1 was reconditioned using only 100% hydrogen to produce a $Ce_xO_y/Al_2O_3$ purifier material 7-2 as summarized in Table 1. Purifier material 7-2 was first tested for its efficiency in adsorbing oxygen contained in helium, and then tested for its efficiency in removing oxygen from ammonia. As shown in Table 1, purifier material 7-2 was found to be efficient in removing oxygen from helium but not from ammonia.

The conditioned and tested purifier material 7-2 was reconditioned first with nitrogen and then with 10% hydrogen to produce a $Ce_xO_y/Al_2O_3$ purifier material 7-3 as summarized in Table 1. Purifier material 7-3 was first tested for its efficiency in adsorbing oxygen contained in helium. Purifier material 7-3 was found to be efficient in removing oxygen from helium. An adsorption capacity of about 0.4 liters of oxygen for each liter of sample 7-3 was found.

TABLE 1

| | | $Ce_xO_y/Al_2O_3$ purifiers | | | |
| --- | --- | --- | --- | --- | --- |
| Sample | Treatment conditions | $NH_3$ Efficiency (ppb $O_2$) | $NH_3$ Capacity $O_2$/material (L/L) | He Efficiency (ppb $O_2$) | He Capacity $O_2$/material (L/L) |
| 6 | $N_2$ at 200° C. for 3 h; $N_2$ at 550° C. for 3 h | No efficiency | — | — | — |
| 7-1 | $N_2$ at 200° C. for 3 h; $N_2$ at 550° C. for 3 h; 10% $H_2$ at 550° C. for 3 h | 19,000 | — | — | — |
| 7-2 | 100% $H_2$ at 300° C. for 5 h | No efficiency | — | <100 | — |
| 7-3 | $N_2$ at 100° C. for 3 h; 10% $H_2$ at 550° C. for 3 h | — | — | <100 | 0.4 |

EXAMPLE 3

Assaying the Oxygen and Water Adsorbing Capabilities of Various Purifier Materials Table 2 summarizes purifier materials prepared according to this invention and tested for their ability to adsorb oxygen and water from ammonia and helium. Table 2 demonstrates that the ability to remove oxygen from a matrix gas is dependent on the type of metal in the thin layer coating of the purifier material. In addition, it was found that $Ni_xO_y/Al_2O_3$ was capable of removing oxygen from an inert gas (e.g., helium) but not from ammonia. $Ce_xO_y/Al_2O_3$ is capable of removing oxygen from ammonia, but not as efficiently as purifier materials in which the metal in the thin layer coating is molybdenum, copper, or cobalt.

TABLE 2

| Purifier Media | NH₃ GAS DATA | | | He GAS DATA | | |
|---|---|---|---|---|---|---|
| | Efficiency (ppb) | Capacity (L/L) | Analytical method | Efficiency (ppb) | Capacity (L/L) | Analytical method |
| Mo$_x$O$_y$/Al$_2$O$_3$ (86 m$^2$/g or 220 m$^2$/g) | O$_2$/NH$_3$: <100 H$_2$O/NH$_3$: <50 | O$_2$/NH$_3$: 0.9–1.3 H$_2$O/NH$_3$: 2.2 | GCDID FTIR | — | | — |
| Ce$_x$O$_y$/Al$_2$O$_3$ (200 m$^2$/g) | O$_2$/NH$_3$: 19 ppm | — | GCDID | O$_2$: <100 | — | GCDID |
| Co$_x$O$_y$/Al$_2$O$_3$ (235 m$^2$/g) | O$_2$/NH$_3$: <100 | O$_2$/NH$_3$: >0.4 | GCDID | O$_2$: <100 | — | GCDID |
| Ni$_x$O$_y$/Al$_2$O$_3$ (3–4% Ni) (100–200 m$^2$/g) | O$_2$/NH$_3$: not effective | — | GCDID | O$_2$: <100 | — | GCDID |
| Cu$_x$O$_y$/Al$_2$O$_3$ (187 m$^2$/g) | O$_2$/NH$_3$: <100 | — | GCDID | O$_2$: <100 | — | GCDID |

The foregoing description is considered as illustrative only of the principles of the invention. Further, since numerous modifications and changes will be readily apparent to those skilled in the art, it is not desired to limit the invention to the exact construction and process shown as described above. Accordingly, all suitable modifications and equivalents may be resorted to falling within the scope of the invention as defined by the claims that follow.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

We claim:

1. A method of removing contaminants from an inert, nonreactive or reactive gas stream comprising contacting said contaminated gas stream with a purifier material for a period of time sufficient to reduce the level of said contaminants to parts-per-billion levels, said purifier material consisting essentially of a nonreactive substrate selected from the group consisting of alumina, amorphous silica-alumina, silica, aluminosilicate molecular sieves, titania, and zirconia, said substrate having a surface and a thin layer of one or more metal oxides deposited on said surface, wherein said metal oxide is selected from the group consisting of oxides of molybdenum, antimony, bismuth, tin, chromium, cobalt, copper, tungsten, manganese, iron, and mixtures thereof and the oxidation state of at least a portion of said metal oxide is less than the highest oxidation state of the metal and greater than the zero oxidation state of the metal.

2. The method of claim 1, wherein the oxidation state of said metal of said purifier thin layer is lower than the maximum oxidation state of said metal.

3. The method of claim 2, wherein said thin layer of said purifier material further contains said metal in a zero oxidation state.

4. The method of claim 1, wherein said inert or nonreactive gas is selected from the group consisting of nitrogen, hydrogen, helium, neon, argon, krypton, xenon, radon, saturated and unsaturated hydrocarbons, saturated and unsaturated halocarbons, NF$_3$, and SF$_6$, and mixtures thereof.

5. The method of claim 1, wherein said reactive gas is selected from the group consisting of SO$_2$, CO, NO, NO$_2$, N$_2$O, CO$_2$, H$_2$S, primary amines, secondary amines, and tertiary amines.

6. The method of claim 1, wherein said contaminants are one or more contaminants selected from the group consisting of oxygen, water, CO, CO$_2$, NO, NO$_2$, N$_2$O$_4$, SO$_2$, SO$_3$, SO, S$_2$O$_2$, and SO$_4$.

7. The method of claim 1, wherein said purifier material is prepared by the method comprising:

(a) providing a precursor comprising said nonreactive substrate having a surface and a thin layer of a metal of a first oxidation state deposited on the substrate surface;

(b) heating said precursor under a flow of a gas at a temperature between about 100° C. and 600° C. for a period of time; and (c) treating said precursor from step (b) under reductive conditions sufficient to reduce the oxidation state of said metal of said precursor thin layer, thereby producing said purifier material, wherein the metal of the purifier thin layer has a second oxidation state that is lower than said first oxidation state.

8. The method of claim 7, wherein said metal of a first oxidation state is selected from the group consisting of an oxide, a salt, an acid, an organic complex, and an inorganic complex of said metal.

9. The method of claim 7, wherein said precursor thin layer is deposited on said substrate surface by a method selected from the group consisting of incipient wetness impregnation, ion exchange methods, vapor deposition, spraying of reagent solutions, co-precipitation, and physical mixing.

10. The method of claim 7, wherein said precursor is heated under a flow of nitrogen gas for about 1 to 200 hours.

11. The method of claim 7, wherein said precursor is heated under a flow of hydrogen gas for about 1 to 200 hours.

12. The method of claim 7, wherein said precursor is heated under a flow of ammonia gas for about 1 to 200 hours.

13. The method of claim 1, wherein said purifier material comprises between about 1 to 90% of said reduced forms of said metal oxide and about 10–99% of said substrate.

14. A method of removing contaminants from an inert, nonreactive or reactive gas stream comprising contacting said contaminated gas stream with a purifier material for a period of time sufficient to reduce the level of said contaminants to parts-per-billion levels, said purifier material comprising a nonreactive substrate selected from the group consisting of alumina, amorphous silica-alumina, silica, aluminosilicate molecular sieves, titania, and zirconia, said substrate having a surface and a thin layer of one or more reduced forms of an oxide of a metal deposited on said surface, wherein the oxidation state of at least a portion of said metal oxide is less than the highest oxidation state of the metal and greater than the zero oxidation state of the metal, and said thin layer has a total surface area less than 100 m²/g.

15. The method of claim 14, wherein said purifier material further comprises an alkaline metal, alkaline metal oxide, or alkaline metal hydroxide deposited over said metal oxide thin layer and/or mixed in with said metal oxide thin layer.

16. The method of claim 14, wherein the oxidation state of said metal of said purifier thin layer is lower than the maximum oxidation state of said metal.

17. The method of claim 16, wherein said thin layer of said purifier material further contains said metal in a zero oxidation state.

18. A method of removing contaminants from an inert, nonreactive or reactive gas stream comprising contacting said contaminated gas stream with a purifier material for a period of time sufficient to reduce the level of said contaminants to parts-per-billion levels, said purifier material consisting essentially of a nonreactive substrate selected from the group consisting of alumina, amorphous silica-alumina, silica, aluminosilicate molecular sieves, titania, and zirconia, said substrate having a surface and a thin layer of one or more reduced forms of an oxide of a metal other than nickel deposited on said surface, wherein the oxidation state of at least a portion of said metal oxide is less than the highest oxidation state of the metal and greater than the zero oxidation state of the metal.

19. The method of claim 18, wherein said thin layer of said purifier material further contains said metal in a zero oxidation state.

20. A method of removing contaminants from an inert, nonreactive or reactive gas stream comprising contacting said contaminated gas stream with a purifier material for a period of time sufficient to reduce the level of said contaminants to parts-per-billion levels, said purifier material consisting essentially of a nonreactive substrate selected from the group consisting of alumina, amorphous silica-alumina, silica, aluminosilicate molecular sieves, titania, and zirconia, said substrate having a surface and a thin layer of one or more metal oxides deposited on said surface and an alkaline metal, alkaline metal oxide, or alkaline metal hydroxide deposited over said metal oxide thin layer and/or mixed in with said metal oxide thin layer, wherein said metal oxide is selected from the group consisting of oxides of molybdenum, antimony, bismuth, tin, chromium, cobalt, copper, tungsten, manganese, iron, and mixtures thereof and the oxidation state of at least a portion of said metal oxide is less than the highest oxidation state of the metal and greater than the zero oxidation state of the metal.

21. A method of removing contaminants from an inert, nonreactive or reactive gas stream comprising contacting said contaminated gas stream with a purifier material for a period of time sufficient to reduce the level of said contaminants to parts-per-billion levels, said purifier material consisting essentially of a nonreactive substrate selected from the group consisting of alumina, amorphous silica-alumina, silica, aluminosilicate molecular sieves, titania, and zirconia, said substrate having a surface and a thin layer of one or more reduced forms of an oxide of a metal other than nickel deposited on said surface and an alkaline metal, alkaline metal oxide, or alkaline metal hydroxide deposited over said metal oxide thin layer and/or mixed in with said metal oxide thin layer, wherein the oxidation state of at least a portion of said metal oxide is less than the highest oxidation state of the metal and greater than the zero oxidation state of the metal.

* * * * *